United States Patent [19]

Jeter

[11] 3,983,948

[45] Oct. 5, 1976

[54] METHOD AND APPARATUS FOR INDICATING THE ORIENTATION OF A DOWN HOLE DRILLING ASSEMBLY

[75] Inventor: John Doise Jeter, Iowa Park, Tex.

[73] Assignee: Texas Dynamatics, Inc., Dallas, Tex.

[22] Filed: July 1, 1974

[21] Appl. No.: 484,413

[52] U.S. Cl. .............................. 175/45; 340/18 NC; 33/301; 33/306
[51] Int. Cl.² ...................................... E21B 47/022
[58] Field of Search .................. 175/45, 40, 26, 50, 175/23; 340/18 NC, 18 P, 18 LD, 18 CM; 33/304, 306, 307, 308, 310, 313, 301

[56] References Cited
UNITED STATES PATENTS

| | | | |
|---|---|---|---|
| 2,925,251 | 2/1960 | Arps | 175/45 X |
| 3,122,213 | 2/1964 | Hawk | 175/45 |
| 3,274,694 | 9/1966 | Hildebrandt | 33/310 X |
| 3,316,651 | 5/1967 | Godbey | 175/45 X |
| 3,455,401 | 7/1969 | Taylor | 175/45 |
| 3,466,754 | 9/1969 | Alder | 175/45 X |
| 3,718,194 | 2/1973 | Hering et al. | 175/45 |
| 3,737,843 | 6/1973 | Le Peuvedic | 340/18 NC |
| 3,789,355 | 1/1974 | Patton | 340/18 NC X |
| 3,791,042 | 2/1974 | Bell | 175/45 X |

*Primary Examiner*—Frank L. Abbott
*Assistant Examiner*—Richard E. Favreau

[57] ABSTRACT

A drilling assembly is equipped with apparatus that includes a device that periodically changes the resistance to the flow of drilling fluid through the drill pipe to create pressure pulses that can be detected at the earth surface and a sensor for controlling the pulse orienting device in response to the orientation of the drilling assembly relative to a preselected orientation relative to earth.

21 Claims, 16 Drawing Figures

METHOD AND APPARATUS FOR INDICATING THE ORIENTATION OF A DOWN HOLE DRILLING ASSEMBLY

This invention relates to a method of and apparatus for indicating at the earth surface when a down hole device, such as a directional drilling assembly, is in the desired orientation relative to earth.

The invention has utility whenever it is desired to determine the orientation of down hole tools relative to earth, but it is particularly advantageous for use with a down hole directional drilling assembly that includes a down hole motor, such as a turbodrill or other fluid operated motor, to rotate the drill bit.

The common practice in orienting down hole directional drilling assemblies is to orient the directional face of the assembly before drilling begins. The orienting device is then removed by wire line extending from the earth surface down the drill string bore to the down hole orienting device. When drilling begins, the reaction torque of the drilling motor, being attached usually to a long and relatively slender drill string, causes the directional tool face to change position relative to earth by twisting the drill string in a direction opposite the direction of rotation of the drill bit. This tendency to move is known in advance and is compensated for in the initial orientation, but since many variables, such as frictional drag of the earth on the drill string, act to influence the amount of position change of the down hole assembly, some inaccuracy is usually present.

During the time drilling is taking place, drilling fluid is conventionally pumped down the bore of the drill string to emerge from the drill string at the bottom, usually through jets in the bit, to return to the earth surface through the well bore outside the drill string. With a constant rate of flow of drilling fluid through the drill string, a constant average fluid pressure is usually observed in the fluid stream at the earth surface. The moving fluid stream is a convenient communication medium and can indicate at the earth surface changes in the resistance to the flow of the fluid stream, such as may be imposed by varying the opening in valves near the lower end of the drill string. The changes in resistance to flow are indicated at the earth surface as temporary changes in fluid pressure in the drilling fluid stream. Such temporary changes in pressure are usually referred to as pulses. The frequency of such pulses may be used in transmitting information but the useful band of frequency is small. The amplitude of such pulses could be used but the amplitude is subject to many variables while traveling along the fluid stream. The existence or absence of pulses is a very reliable means to transmit simple information and requires only relatively simple down hole transmitting apparatus.

Therefore, it is an object of this invention to provide a method and apparatus for indicating at the surface of the earth when a directional drilling assembly, or the like, is in a desired orientation relative to earth both before and during the drilling operation.

It is another object of this invention to provide a method of and apparatus for generating, at or near the lower end of a drill string, a signal detectable at the earth surface when a directional drilling assembly that includes a fluid powered motor and a deflection tool face is in the desired azimuthal orientation relative to earth both before and after drilling has started.

It is another object of this invention to provide a method and apparatus for generating, at or near the lower end of a drill string, a signal detectable at the earth surface when a down hole drilling assembly is within a preselected angle of earth vertical.

It is another object of this invention to provide a method and apparatus for changing the circumstances under which a down hole device will generate a signal detectable at the earth surface by changing the rate of flow of drilling fluid being pumped down the drill string.

It is another object of this invention to provide apparatus to change the circumstances under which a signal will be generated in the drilling fluid stream when the down hole drilling assembly, rotationally affixed to the drill string, stops rotating and when it starts rotating.

These and other objects, advantages and features of this invention will be apparent to those skilled in the art from consideration of this specification, including the attached drawings and appended claims.

BRIEF DESCRIPTION OF DRAWINGS

In the drawings, wherein like reference characters are used throughout to designate like parts.

DETAILED DESCRIPTION OF DRAWINGS

In accordance with the method and apparatus of this invention, means are provided for creating a temporary change in the resistance to flow of drilling fluid through the drill string to create a pressure pulse that is detectable at the earth surface. A pressure pulse as used herein is defined as a temporary change in pressure, the change being either an increase in pressure or a decrease in pressure.

A pressure pulse that results from a decrease in the resistance to the flow of fluid through the drill string can conveniently be generated by opening a valve to allow fluid to flow from inside the drill string to the outside of the drill string bypassing fluid flow resistances such as drill bit jets. Such a valve should be normally closed to conserve energy, and briefly opened to create a pulse. Such by-pass valves are not generally trusted in oil well drilling operations because they are hard to make fail-safe in the usual abrasive down hole environment.

The preferred pressure pulse generating method and the one utilized in the preferred embodiment of this invention is a valve in the drill string through which the drilling fluid moves within the drill string which is normally open to conserve energy, being briefly actuated toward closure to create a pressure pulse.

The term orientation as used herein refers to the relationship to three earth dimensions defined by the earth gravity vector and a plane perpendicular to the gravity vector containing the earth poles. When orientation is achieved by relationship to intermediate factors such as the earth magnetic field and an inclined bore hole low side, such qualifiers will be used as they apply to specific descriptions of methods, elements or functions of the apparatus of this invention.

Figure 1:
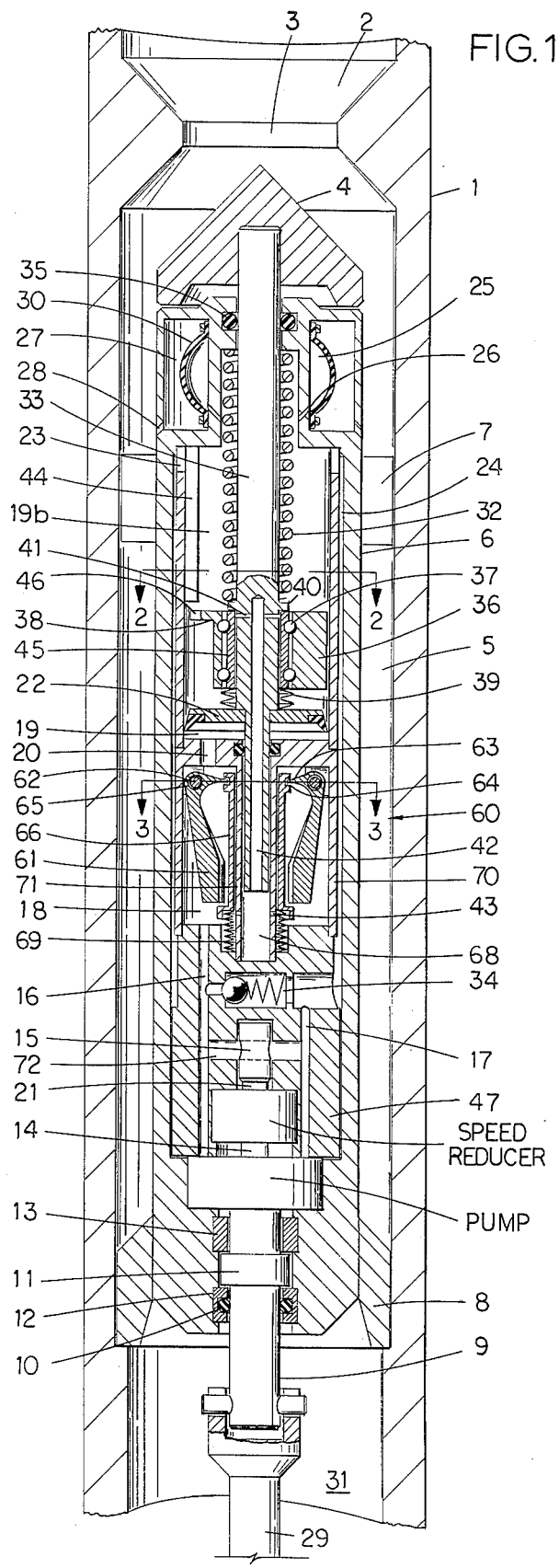
FIG. 1 is a longitudinal sectional view of a preferred embodiment of the apparatus of the invention.
Figure 2:
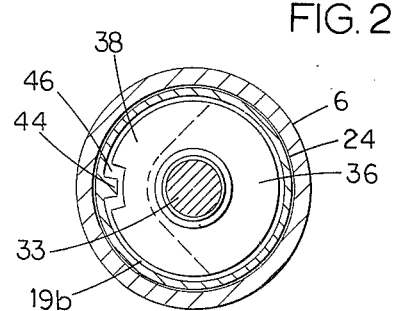
FIG. 2 is a transverse sectional view of the apparatus of FIG. 1 taken along lines 2—2.
Figure 3:
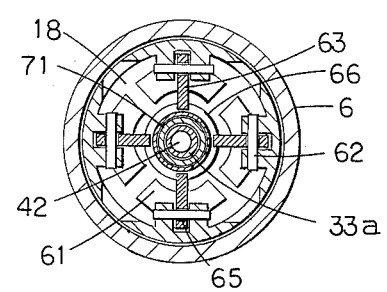
FIG. 3 is a transverse sectional view of the orientation sensor of the apparatus of FIG. 1 taken along lines 3—3.

In the embodiment shown in FIG. 1, means to change the resistance to flow through the drill string includes poppet 4 which moves relative to orifice 3 in housing 1 to change the size of the opening between the poppet and the orifice and hence to change the resistance to the flow of fluid through the opening between the poppet and the orifice, and thereby change the resistance to flow of fluid through the drill string.

Housing 1 is located in and is part of the drill string (not shown). Preferably the housing is positioned just above the drilling assembly which normally includes a drill bit but may also include a down hole motor just above the bit to rotate the bit while drilling.

Means to move poppet 4 toward orifice 3 is enclosed in body 6 which is supported within housing 1 by spiders 7 at the upper end and spiders 8 at the lower end. Power to operate the means to move the poppet is provided by a down hole motor (not shown) and because a drilling motor may often be used to supply power, a shaft 9 extends from the lower end of the body. Shaft extension 29 connects shaft 9 to whatever down hole motor is used.

Drilling fluid moving downward through the drill string flows along opening 2, flows through orifice 3, around poppet 4, downward along annular passage 5, between the body and the housing and continues downward through bore 31 to the drilling assembly below (not shown).

Rotation by the motor of shaft extension 29 rotates shaft 9 which includes bearing arbor 11 constrained axially and rotatably within bearings 12 and 13. Shaft 9 extends through the pump as shaft extension 14. The bearing 12 contains seal 10 in contact with the shaft to retain working fluid, normally oil, within body 6, and to prevent entry of drilling fluid from outside the body. The pump has a rotor attached to arbor 11 and a stator constrained against rotation in body 6. The pump discharge is connected to channel 16, the intake being connected to channel 17.

Means to time the periodic application of power to means to move poppet 4 toward orifice 3 is achieved in the embodiment shown by actuating a valve, controlling the fluid moved by the pump, at intervals encompassing a preselected number of turns of the motor.

Shaft extension 14 drives the input of the speed reducer, the output shaft 21 of the reducer being connected to valve element 15. The valve element, in conjunction with passage 72 in valve block 47, due to rotation of element 15, periodically closes passage 72. When passage 72 is not closed it allows fluid to move directly from the pump discharge through channels 16, 72 and 17, back to the pump intake, and the fluid is incapable of doing work. At intervals related to the number of turns of shaft 9, element 15 closes passage 72 and fluid entering channel 16 is directed into cavity 18. Pressure in channel 16 is limited by relief valve 34. When pressure in channel 16 exceeds a preselected value, it flows through the relief valve to channel 17 and to the pump intake.

Unless the fluid under pressure in cavity 18 is vented back to the pump intake by control actions to be described later, it moves upward through passage 20 into cylinder 19 below piston 22 and urges piston 22 upward overcoming the force of spring 32, moving rod 33 upward. Poppet 4 is attached to the upper end of rod 33 and moves upward with the rod, approaching orifice 3 and creating a pressure rise in the moving drill fluid stream. After a preselected number of turns of the motor, and speed reducer output shaft 21, valve element 15 opens channel 72 and fluid moves from under piston 22 through passage 72 into the pump intake and the piston moves down, urged by spring 32. Poppet 4 moves downward from orifice 3, reducing the resistance to movement of fluid down the drill string, thus reducing the pressure detected at the earth surface and a pulse is completed.

In accordance with this invention, means are provided to permit or prevent the creation of pulses by the apparatus of FIG. 1 in response to the orientation of the apparatus so that the existence of periodic pressure pulses at the earth surface indicates one thing and the absence of the pulses indicates another.

Since the creation of pressure pulses down hole in the embodiment of FIG. 1 indicates also that the down hole motor is running and not stalled, it is preferred to have this information while the down hole drilling assembly is in the preferred orientation. This is particularly important if the down hole motor is a drilling motor providing power to a drill bit.

In the embodiment shown in FIG. 1, the pulse controlling means includes an earth gravity sensor in the form of an eccentric weight 36, which is mounted for rotation about rod 33 on bearings 37. The eccentric weight has a center of gravity radially displaced from the centerline of rod 33. The center of gravity will lie in a plane containing the center of gravity of the eccentric weight, the earth gravity vector and the centerline of rod 33. Bearings 37 axially affix eccentric weight 36 to sleeve 45 which is slidably situated on rod 33, urged upward on the rod by spring 39 against flange 40 on rod 33. When sleeve 45 is upward against flange 40, it covers port 41. If sleeve 45 is moved downward relative to rod 33 to uncover port 41, fluid pressure tending to move piston 22 upward will be vented to prevent upward movement of piston 22 unless the fluid under pressure below the piston is prevented from reaching port 41 by a rotation sensor to be described later. When piston 22 moves upward the eccentric weight moves upward in cavity 19b which is the upper extension of the bore of cylinder 19. If the eccentric weight encounters no obstruction in its upward movement, a pressure pulse is generated. An obstruction in the form of index post 44 is attached to the side wall of cavity 19b. Eccentric weight 33 has flange 38 which will hit the index unless it is in such a rotational position within cavity 19b that notch 46 in flange 38 coincides with the index post so that the eccentric weight can move upward. The angular relationship of index post 44 relative to the down hole drilling assembly is known. The eccentric weight will have a known rotational relationship to the low side of an inclined hole; hence if a drilling fluid pressure pulse is created and detected at the earth surface it will be known that the index post rotational position coincides with the rotational position of notch 46, hence it will be known that the down hole drilling assembly is in a preselected orientation relative to the low side of an inclined bore hole.

If notch 46 is not aligned with post 44, the post will hit flange 38 after a small upward movement and the upward movement of the eccentric weight will be stopped. Upward movement of sleeve 45 will be stopped and rod 33 will continue to move upward sliding through the bore of the sleeve until port 41 is uncovered. Fluid in cavity 18 will enter port 43 and opening 68 to move upward through duct 42 and out port 41 into cavity 19b. Fluid moves from cavity 19b through ports 23, down annular duct 24 to channel 17, and to the pump intake. Thus, if the down hole drilling assembly is not in a preselected orientation relative to the low side of an inclined bore hole the fluid from the pump will be vented back to the pump intake and be unable to move piston 22 upward to create a pressure pulse in the drilling fluid stream and no pressure pulse will be detected at the earth surface indicating by the absence of the pulse that the down hole drilling assembly is not in the preselected orientation relative to the bore hole low side.

The apparatus of FIG. 1 is capable of practicing orientation purposes relative to hole low side with the elements described to this point. As will be later described, with different sensors replacing the eccentric weight, other orientation functions may be practiced. In many applications it will be desirable to use the apparatus to aid in orienting down hole drilling assemblies when the drill string is not being rotated and use the apparatus to derive other information such as turbodrill rotational speed when the drill string is being rotated. In the apparatus of FIG. 1, a rotation sensor 60 is included to control the influence of the orientation responsive elements so that, while the drill string is being rotated above a preselected rate, a pressure pulse will be generated at intervals determined by the speed of the motor regardless of the action of the orientation related elements.

The rotation sensor 60 comprises enclosure 70 having central cavity 18 in which flyweights 61 are pivotably suspended on pivot pins 62. Pins 62 are attached to enclosure 70 and extend through holes 65 in the flyweights. The flyweight center of gravity is below pin 62. When the drill string rotates and the flyweights thereby rotate about the apparatus centerline, the center of gravity of the flyweights tend to move radially outward. A part of each flyweight is lever 63 extending radially inward to engage groove 64 of sleeve 66. Sleeve 66 is slidably situated around central tube 71 and is biased upward by spring 69. Sleeve 66 equalizes the position of the flyweights to keep them sychronized in inclined holes and in conjunction with spring 69 urges the flyweight center of gravity radially inward. In addition, sleeve 66 serves as a valve element to cover ports 43 when moved down and open ports 43 when moved upward. It is seen, then, from the foregoing that when the drill string is rotated, the flyweights will tend to move radially outward and tend to move sleeve 66 downward, the tendency being proportional to the rotation rate of the drill string. It is seen, then, that when the drill string is rotating above a preselected rate rotation sensor 60 will close ports 43 preventing the flow of fluid from cavity 18 to the orientation sensor elements, thus disabling the sensor, and when the drill string is not rotating above a preselected rate, sensor 60 will open ports 43 and allow fluid to flow to the orientation sensor elements so that they can carry out their intended actions.

Body 6 is sealed against intrusion of drilling fluid at the top by seal 35 in contact with rod 33. Pressure within body 6 is equalized with pressure outside the body by flexible membrane 30 which encloses annular space 25 within cavity 27. Ambient fluid pressure is communicated to cavity 27 from annulus 5 by holes 28. Fluid within annular space 25 can communicate with the general enclosure of body 6 through holes 26.

The foregoing description, in conjunction with the drawings, has demonstrated the means to practice the invention utilizing a power source, a timing means and an actuator to create a pressure pulse in the drilling fluid stream, and to control the periodic application of power to create such pulses by an orientation sensor, further controlled (optionally) by a rotation sensor. In the following description pertaining to alternate choices of sensors, descriptive material will be confined to the actions by which the sensors control the application of power to create fluid stream pressure pulses. The structure of the embodiment of FIG. 1 can be adapted to accept such other sensors and controls to be described.

Figure 4:
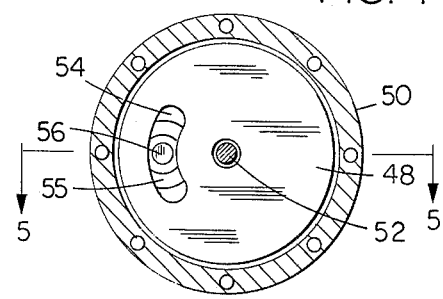
FIG. 4 is similar to FIG. 3 and represents another embodiment of an orientation sensor for use with the apparatus of this invention.
Figure 5:
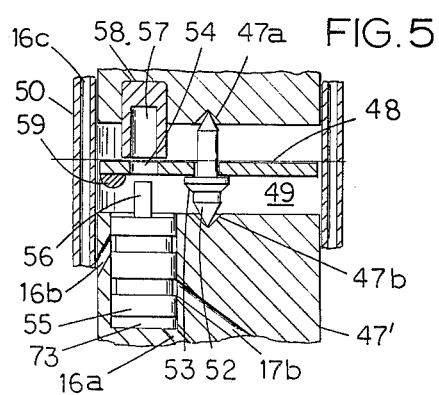
FIG. 5 is a longitudinal sectional view of the sensor of FIG. 4 taken along line 5—5 of FIG. 4.

FIG. 4 and FIG. 5 represent an embodiment having means to sense the direction of a magnetic field, means to detect the rotational relationship of body 6, relative to the magnetic field sensor and, further, means for the detector to control the delivery of hydraulic power from the pump of FIG. 1 to the valve in the drilling fluid stream and hence control the creation of pressure pulses in the drilling fluid stream. When the magnetic field sensor of FIGS. 4 and 5 is used, the eccentric weight 36 will be removed from the apparatus.

A magnetic compass 48 of disc shape is supported for the rotation in cavity 49 of block 47' by spindle 52 which is supported for rotation on its longitudinal axis by bearing dimples 47a and 47b. All materials in the cavity in the vacinity of the compass are non-magnetic so that the magnetic field in the earth may penetrate therethrough. Compass disc 48 is free to slide upward on spindle 52, but normally rests on flange 53 of the spindle. Channel 16 of FIG. 1 is in communication (not shown) with channel 16a of block 47'. When fluid pressure is imposed in channel 16 and 16a below valve element 55 located in cylinder 73 in block 47', the valve moves probe 56 upward toward disc 48. If the probe encounters arcuate opening 54 in the disc it continues upward into opening 57 in back-up plug 58 to the limit of travel of the probe and valve 55, In that position, valve 55 admits fluid pressure from channel 16a to channel 16b. Channel 16b is in communication through an opening (not shown) with channel 16c which continues upward into cavity 18 of FIG. 1. Fluid pressure in cavity 18, by actions previously described, will cause a pulse to be created in the drilling fluid stream.

When fluid pressure is imposed on channel 16a, moving probe 56 upward and compass disc 48 is in such a position that the probe hits the disc, not opening 54, the disc will be moved upward off shoulder 53 and the upper surface of the disc will hit the lower surface of back-up plug 58. The upward movement of the probe will be stopped in a low position and valve 55, in the low position, will vent fluid from channel 16a to channel 17b which is in communication through a port or opening (not shown) with channel 17 of FIG. 1. The fluid pressure will thus be vented to the pump intake and no pulse will be created in the drilling fluid stream.

Weight 59 on disc 48 is to compensate for the removal of material to form arcuate opening 54, so that the disc is balanced. If the rotation sensor 60 is to be used in conjunction with the magnetic field sensor, channel 16a is in communication with opening 68 so that ports 43 may bypass valve 55 to admit fluid to cavity 18. Cavity 49 is also in communication with opening 68 so that once bypassed, the fluid pressure in channel 16a will not cause valve 55 to move upward. The rotation sensor may thereby disable the magnetic compass position detector valve 55 due to drill string rotation when its utilization is not desired.

An alternate embodiment of the means to create pressure pulses in the drilling fluid stream is shown in FIGS. 6, 7, 8 and 9. In this embodiment the position of the poppet relative to the orifice may be utilized as means to detect changes in drilling fluid flow rate and to alter the circumstances under which orientation sensors will cause or prevent a pressure pulse to be generated in the drilling fluid stream in response to different ranges of drilling fluid flow rates.

Figure 6:
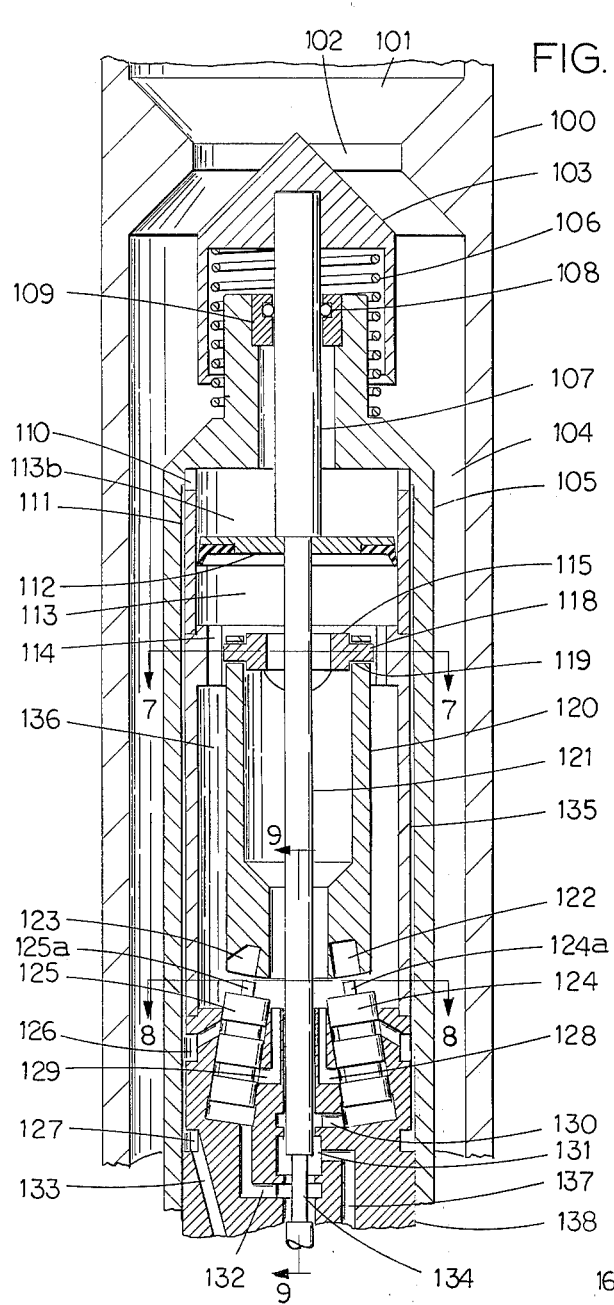
FIG. 6 is a longitudinal sectional view of another embodiment of the apparatus of this invention.
Figure 7:
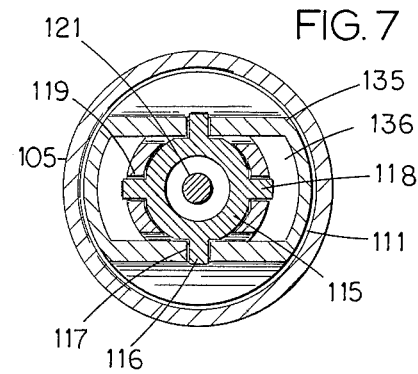
FIG. 7 is a transverse sectional view taken along line 7—7 of FIG. 6.

In this embodiment, housing 100 is part of the drill string (not shown). Bore 101 of the housing contains orifice 102. Body 105 is supported within housing 100 by means not shown. Poppet 103 is biased toward orifice 102 by spring 106. When fluid is flowing downward in the drill string through the orifice it imposes a downward impulse force on the poppet, opposing spring 106 and flows downward in annulus 104. The position of the poppet then relative to the orifice will vary with changes in drilling fluid flow rate, moving farther downward with greater flow rates. Poppet 103 is attached to rod 107 and the axial motion of the poppet causes axial motion of rod 107. Piston 112 is affixed to rod 107 which continues downward as rod extension 121 which is contoured to form spool valve 134 at the bottom. Spool valve 134 then assumes an axial position relative to body 105 that is determined by the rate of drilling fluid flow. Spool valve 134 then cooperating with appropriate fluid channels can direct fluid power from the pulse interval timing means to different orientation sensor position detectors in response to different drilling fluid flow rates. The device of FIG. 6 is provided with pendulum 120 to sense earth vertical and valve 124 to detect the orientation of the apparatus centerline relative to earth vertical and also provided with valve 125 to detect the azimuthal orientation of the apparatus relative to bore hole low side.

Tubular pendulum 120 hangs with two degrees of freedom in cavity 136 of enclosure 135. The pendulum hangs on bearings 119 pivotable about journals 118 which are part of axis cross 115. Cross 115 has journals 116 transverse journals 118. Journals 116 are pivotably situated in bearings 117 which are part of enclosure 135.

The pendulum is centered about the centerline of the apparatus as shown, indicating that the apparatus is vertical relative to earth. The position of the poppet indicates a relatively high flow rate of drilling fluid through the orifice. When fluid pressure from the interval timing means is admitted to channel 137 in valve block 138 it enters chamber 131. The position of spool valve 134 admits the fluid pressure to channel 132 to be imposed below valve 125. By actions to be described later valve 125 extends probe 125a toward the lower surface of the pendulum. Recess 123 in the pendulum is shaped such that probe 125a will enter the recess if the pendulum is vertical or if moved right in the plane of the drawing. Recess 123 is narrow, however, such that if the pendulum is moved transverse to the plane of the drawing, beyond preselected limits, probe 125a will miss the recess 123 and hit the lower end of the pendulum. Thus probe 125a will enter recess 123 only if the plane of the drawing contains the earth gravity vector, the centerline of the apparatus and the centerline of probe 125a. The position of probe 125a will have a known relationship to a directional drilling assembly tool face. Normally, recess 123 will be somewhat wider than the probe diameter to permit some varience from perfection in rotational orientation of the apparatus. If the probe hits the lower end of the pendulum it will be stopped in such a position that valve 125 will vent the fluid from channel 132 to collector annulus 126 which is in communication with channel 133 which is also in communication with the pump intake. No pressure pulse will be created in the drilling fluid stream. If, however, probe 125a enters recess 123 it will move upward to its travel limit and in the process of moving upward will encounter the diminishing contour of recess 123, thus urging the pendulum toward a central position. At the upper limit of travel of probe 125a, valve 125 will admit fluid from channel 132 to channel 129 which is in communication with cavity 136 and cylinder 113. Fluid admitted to cylinder 113 will act upwardly on piston 112. Piston 112 will move upward, moving in turn rod 107 to which it is affixed. Upward movement of rod 107 moves poppet 103 toward orifice 102 to cause an increased resistance to drilling fluid flow. Upward movement of spool valve 134 will admit fluid from chamber 131 to channel 130 before closing the passage from the chamber to channel 132. Fluid entering channel 130 will cause valve 124 to extend probe 124a. Probe 124a will enter hole 122 in the pendulum because the pendulum has been centered by probe 125a by its action against the converging surface of recess 123. A drilling fluid pressure pulse will be created.

If the rate of flow of drilling fluid down the drill string is relatively low, poppet 103 will be farther upward and when fluid under pressure is admitted to channel 137 and chamber 131 and spool valve 134 will be in such a position that fluid will be admitted from the chamber to channel 130. Valve 124 will move probe 124a upward. If the pendulum vertical axis is sufficiently close to the centerline of the apparatus, probe 124a will enter hole 122 and move to its upper limit of travel. In that position, valve 124 will admit fluid from channel 130 to channel 128 and hence to cavity 136 and cylinder 113. Piston 112 will move upward and a drilling fluid pressure pulse will be created. If, however, the pendulum vertical axis is sufficiently displaced from the apparatus centerline and probe 124a misses hole 122 and hits the lower surface of the pendulum, probe 124a will be stopped short of full travel and, in that position, valve 124 will vent fluid from channel 130 to annulus 126 which is in communication with channel 133 which, in turn, leads to the pump intake and no pressure pulse will be created in the drilling fluid stream.

When, as hereinabove described, fluid is admitted to cavity 136, it moves upward through opening 114 in enclosure 135 and into cylinder 113. As piston 112 moves upward, fluid displaced from the upper end of cylinder 113 shown as 113b, it moves through ports 110 and down annular duct 111 to channel 133 and to the pump intake.

Rod 107 is slidably situated in bearing 109 and the penetration from body 105 is sealed by seal 108 in contact with the rod to prevent leakage of fluid from within the body and to prevent the intrusion of drilling fluid. No hydrostatic equalizer is shown, but one much like membrane 30 of FIG. 1 will be situated somewhere in the structure of body 105 to equalize pressure inside body 105 with the pressure outside the body.

Figure 9:
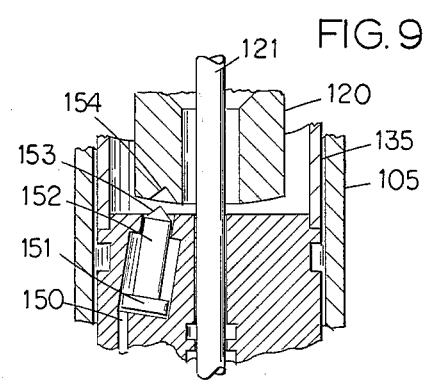
FIG. 9 is a longitudinal partial sectional view taken along line 9—9 of FIG. 6.
Figure 8:
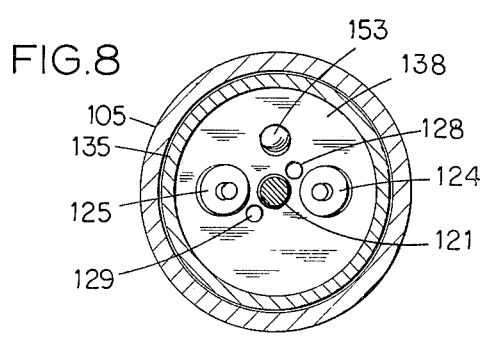
FIG. 8 is a transverse sectional view taken along lines 8—8 of FIG. 6.

If a rotation sensor is used to disable the orientation related elements the sensor will, during drill string rotation, admit fluid from channel 137 to channel 150 of FIG. 9. This will cause piston 151 to move upward, moving piston rod 152 upward and urge conical end 153 of the rod into conical recess 154 of the pendulum, thus centering the pendulum. In addition to protecting the pendulum from shock damage this will assure that both probes will encounter a recess in the pendulum, thus assuring the creation of a pressure pulse in the drilling fluid stream each time fluid under pressure is admitted to channel 137 by the interval timer.

Figures 10A, 10B:
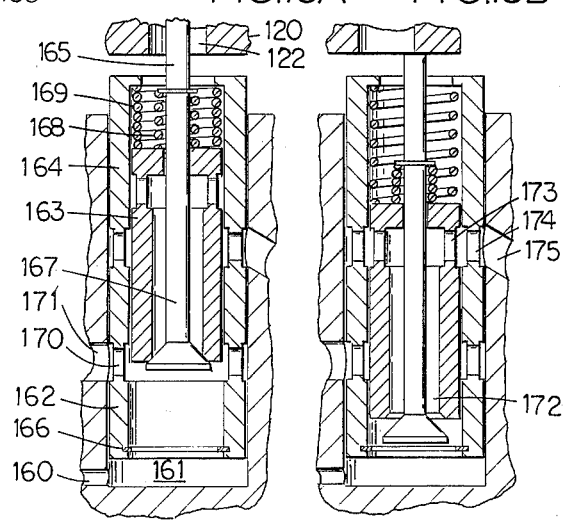
FIG. 10A is a longitudinal sectional view of an enlarged scale of an alternate embodiment of an orientation sensor position detector for use with the apparatus of FIG. 6.
FIG. 10B is a view of the sensor of FIG. 10A with the detector in a different level of actuation.

Plumbing and fluid control practices well established in the art indicate that the function of valves 124 and 125 of FIG. 6 can be carried out by spool valves. In application, however, down hole instrumentation commonly experiences the intrusion of particulate solids in the working fluids. These particulates tend to jam close-fitting spool valves. If system maximum pressure is made available to force movement of spool valves, the resulting forces may damage delicate sensors. FIG. 10A and FIG. 10B illustrate two positions in the action of a valve designed to permit maximum system pressures to force actuation yet minimize the chance of damage to delicate sensors.

Actuation fluid pressure is admitted to channel 160 and cylinder 161. Before actuation, piston 163 is downward as urged by spring 169 against retaining ring 166 in valve body 162. Pressure in cylinder 161 causes piston 163 to move upward. Valve 167 is held closed, upward, by spring 168. As the piston and valve rise, probe 165 being an extension of valve 167 rises. If the probe enters hole 122 in pendulum 120, piston and valve continue to rise until piston 163 uncovers port 170. This conducts fluid into channel 171 which in the preferred embodiments of the invention will cause a signal pressure pulse to be created in the drilling fluid stream.

If hole 122 is so misaligned due to the displacement of pendulum 120 that probe 165 will not enter the hole but will instead hit the lower end of the pendulum, different fluid channeling receives the working fluid. As pressure enters cylinder 161 below piston 163, the piston and the valve move upward and probe 165 hits the lower face of the pendulum 120. The valve 167 is stopped from upward motion. The piston 163 continues upward compressing both spring 168 and spring 169. Valve 167 is unseated and fluid from cylinder 161 can flow along piston bore 172 to ports 173, out ports 173, through port 174 to channel 175. In the preferred embodiments, channel 175 will return to the pump intake. No signal pressure pulse will be produced in the drilling fluid stream.

Figure 11:
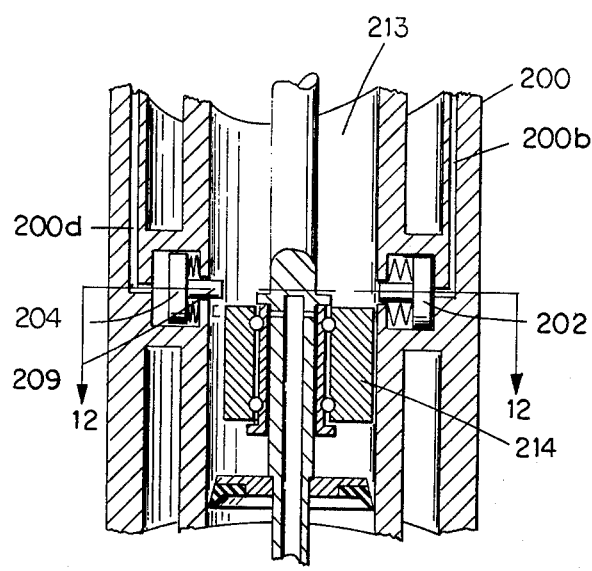
FIG. 11 is a longitudinal sectional view of an alternate embodiment of the orientation sensor of the apparatus of this invention.
Figure 12:
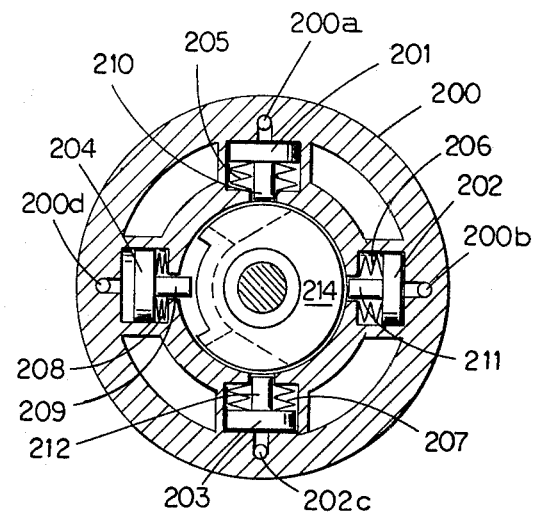
FIG. 12 is a sectional view taken along line 12—12 of FIG. 11.

The device of FIG. 11 illustrates a means for an orientation sensor such as described relative to FIG. 1 to respond to signals from an external control device and change the azimuthal location of the index post (part 44 of FIG. 1) relative to body 200. Since an advantage of this invention is to improve the ability of an operator of down hole devices, at the earth surface, to both drill straight holes and, when elected by the drill operator, change the direction of the hole as it is drilled, then revert back to straight hole drilling activity when desired, this device of FIG. 11 allows the driller to adapt down hole instruments to changing situations. During a single down hole bit run, it may be necessary to increase or decrease the deviation of the hole from vertical or change the hole low side vector in either azimuthal direction. A device capable of controlling the index posts is disclosed by U.S. Pat. No. 3,896,667 issued July 29, 1975.

The description of the action of the device of FIG. 11 will be confined to change in location of the index post azimuthal location since all other related actions have been described in relation to FIG. 1.

In the FIG. 11 configuration, four index posts are available, but the number used in practice is a designer's choice. Assume it is desirable to activate the index post on the left side of FIG. 11. The control device (not shown) admits fluid under pressure to duct 200d, piston 204 moves right compressing spring 208 and extending index post 209 into the cavity 213 to control the axial movement of the eccentric weight 214. Removal of fluid pressure from duct 200d by the external control device will allow piston 204 to move left as urged by spring 208, retracting index post 209.

With all index posts retracted, the device of FIG. 1 will act as a down hole motor speed indicator whether or not the rotation sensor is used and behave as if the eccentric weight did not exist.

To change the azimuthal orientation at which the invention will send a drilling fluid stream signal to the earth surface by 180°, the control device applies fluid pressure to duct 200b. Piston 202 will move left compressing spring 206 and extend index post 211 into cavity 213 to control the action of the eccentric weight. With four index post extending means, the operator has orientation choices in 90° increments upon appropriately exercising the down hole control means.

It is often desirable to maintain a directional hole within a specific range of deviation from vertical and to readily determine if the hole direction is remaining within limits of deviation as it is being drilled.

Referring to the description of the device of FIG. 6, it can be seen that the difference between the diameter of the holes in the lower face of the pendulum and the diameter of the probes which detect the location of such holes determines the hole mislocations which represent the limits of misorientation at which a signal will be transmitted to the surface of the earth. It follows that a group of holes of different diameter on the pendulum lower surface, each served by a probe can, each upon command to do so, respond to a different limit of misorientation by selective activation of particular probes.

Figure 13:
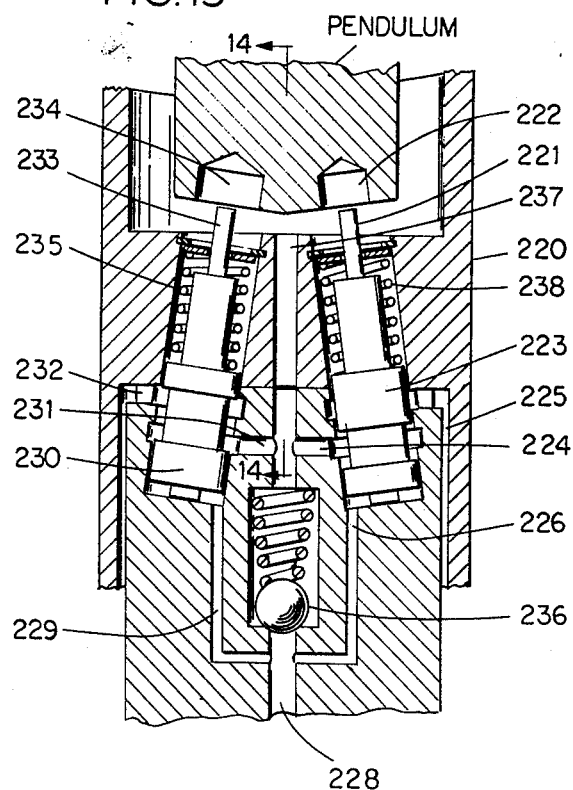
FIG. 13 is a longitudinal sectional view of another embodiment of orientation sensors for sensing orientation between two limits.

Referring to FIG. 13, it can be seen that two hole-probe combinations can be selected to produce a signal to the earth surface only if the deviation is more than a selected angle but less than a greater angle. A larger hole and a smaller hole is employed. When pressure is applied to channel 226, valve 223 will move upward compressing spring 238, extending probe 221 upward. The probe 221 will miss the smaller hole 222 and hit the pendulum if the deviation of the pendulum from the apparatus centerline is above a preselected amount. The spool valve 223 will block the passage of fluid from channel 224 to channel 225 and permit a pulse to be produced if the probe hits the pendulum but will vent the fluid pressure from source channel 224 to pump return channel 225 if the probe goes into hole 222 and prevent the generation of a signal pulse.

Probe 233 will enter hole 234 in the pendulum if the angle is below a preselected amount and will hit the pendulum at all greater angles of pendulum axis compared to the apparatus centerline. When a working fluid pulse is admitted to channel 229, spool valve 230 will move upward overcoming spring 235 and extend probe 233. If probe 233 enters hole 234 the spool valve will continue upward travel to its limit and fluid in channel 231 will be blocked from the pump intake channel 232 and a signal to the surface will be generated. If probe 233 hits the pendulum, valve 230 will be stopped and will vent working fluid from channel 231 to channel 232 and the pump intake and no signal will be generated.

To generate a signal to the earth surface, then, by the device of FIG. 13, probe 221 must not enter hole 222 and probe 233 must enter hole 234. This indicates to the operator at the earth surface that the orientation of the down hole drilling assembly is above the amount characteristic of the hole 222 and below the amount characteristic of hole 234.

The relief valve 236 assures enough pressure below the spool valves to hold them upward to the position allowed by the probe whether fluid flows on into channel 237 to operate the signal producing means, or is vented into the pump return by either valve.

Figure 14:
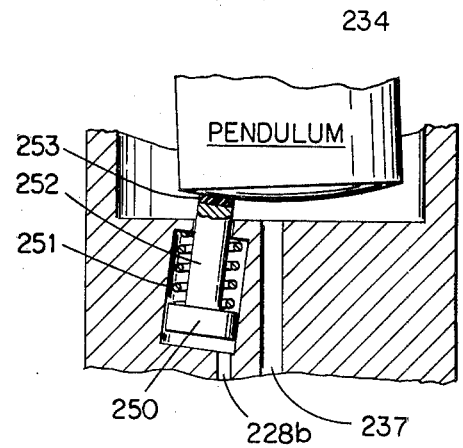
FIG. 14 is a longitudinal view partly in section and partly in elevation taken along line 14—14 of FIG. 13.

The device represented by FIG. 14 is intended to hold the pendulum in the position it was in when pressure supplied at intervals to the detector valves begins to extend probes. It is possible some vibration in the down hole apparatus could oscillate the pendulum and allow it to skid on an extending probe. As shown, the FIG. 14 is a side sectional view through FIG. 13. The piston 250 is urged downward by spring 251. When fluid pressure is imposed on channel 228b, which is in communication with channel 228, it urges piston 250 upward. Spring 251 is weaker than the valve springs 235 and 238, and the rise of piston 250 is completed before the valves move upward. The piston rod 252, fitted at the end with friction material 253, hits the pendulum lower surface, holding the pendulum stationary as the probes 221 and 223 rise and carry out their detection function.

Since the working fluid pressure in channel 228 rises and falls periodically due to the action of the pulse interval timing valve, the pendulum will be periodically released to seek the earth gravity vector.

Figure 15:
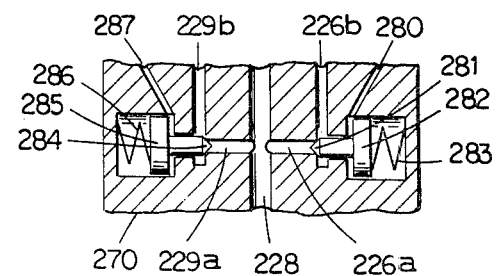
FIG. 15 is a longitudinal sectional view of another embodiment of the apparatus of FIG. 13 that responds to external commands.

The device of FIG. 15 represents a modification of the device of FIG. 13 and similar features have similar reference numbers. As hereinbefore described, the invention can be devised to respond to commands from external control means and this embodiment of the device of the invention is intended to respond to such controls. The device of FIG. 13 can be constructed with a pendulum having a plurality of holes with a probe for each hole. The size of the holes relative to the associated probe determines the angle relative to earth vertical for which the hole and related probe can test. A plurality of holes, each of different size, offers a means to select a range of orientation responses for the invention by selecting which probe will be energised. In FIG. 15, the fluid channels to all probes, two of which are shown, are biased closed by a spring loaded valve poppet. Any valve may be opened by fluid pressure from the external control means. For instance, the fluid source in channel 228 enters channel 226a but is normally prevented from reaching valve 223 by the selector valve poppet 281, attached to piston 282, because the spring 283 urges the poppet left to close the channel 226a. When the probe 221 is to be exercised due to the choice made through the external control means, fluid pressure is applied to channel 280. This urges piston 282 right overcoming spring 283 and moving poppet 281 right, opening channel 226a to 226b. Working fluid pulses applied to channel 228 will now be conducted to valve 223 and the probe 221 will be exercised as previously described.

When the external control means is used to exercise probe 233, pressure will be applied to channel 287. Piston 285 will move left overcoming spring 286 and move poppet 284 left. This will open channel 229a to channel 229b and valve 230, and probe 233 will be exercised.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

I claim:

1. A method of indicating at the earth surface when a drilling assembly connected to a drill string is in a preselected orientation with respect to earth, said method comprising the steps of pumping drilling fluid down the drill string, and temporarily changing the resistance to flow of drilling fluid in the drill string to create occasional pressure pulses in the drilling fluid that can be detected at the earth surface to indicate by their presence alone that a down hole assembly is in a preselected orientation relative to earth.

2. The method of claim 1 utilizing means responsive to the rate of flow of drilling fluid through the drill string to change said preselected orientation.

3. The method of claim 1 utilizing means responsive to external control means to change the nature of said preselected orientation.

4. A method of indicating at the earth surface when a drilling assembly connected to a drill string is in a preselected orientation with respect to the low side of a non-vertical well bore, said method comprising the steps of pumping drilling fluid down the drill string, and temporarily changing the resistance to the flow of drilling fluid in the drill string to create occasional pressure pulses in the drilling fluid that can be detected at the earth surface to indicate by their presence alone that the drilling assembly is in said preselected orientation.

5. A method of indicating at the earth surface when a down hole drilling assembly connected to a drill string is in a preferred orientation with respect to a magnetic field, said method comprising the steps of pumping drilling fluid down the drill string, and temporarily changing the resistance to the flow of drilling fluid in the drill string to create occasional pressure pulses in the drilling fluid that can be detected at the earth surface to indicate by their presence alone that the assembly is in said preselected orientation.

6. A method of indicating at the earth surface when a down hole drilling assembly connected to a drill string is within a preselected angle of deviation from earth vertical, said method comprising the steps of pumping drilling fluid down the drill string, and temporarily changing the resistance to the flow of drilling fluid in the drill string to create occasional pressure pulses in the drilling fluid that can be detected at the earth surface to indicate by their presence alone that the drilling assembly is within said preselected angle of deviation from earth vertical.

7. A method of indicating at the earth surface when a drilling assembly that is connected to a drill string and includes a down hole motor having a stator and a rotor is in a preselected orientation relative to the low side of a non-vertical well bore, said method comprising the steps of pumping drilling fluid down the drill string, actuating the down hole motor to rotate the rotor relative to the stator, and temporarily changing the resistance to the flow of drilling fluid down the drill string at time intervals related to the rotation rate of the rotor to create pressure pulses in the drilling fluid that can be detected at the earth surface to indicate by their presence alone that the assembly is in said preselected orientation.

8. A method of indicating at the earth surface when a drilling assembly that is connected to a drill string and includes a down hole motor having a stator and a rotor is in a preselected orientation relative to a magnetic field, said method comprising the steps of pumping drilling fluid down the drill string, actuating the down hole motor to rotate the rotor relative to the stator and temporarily changing the resistance to the flow of drilling fluid in the drill string at time intervals related to the rotation rate of the rotor to create pressure pulses in the drilling fluid that can be detected at the earth surface to indicate by their presence alone that the assembly is in said preselected orientation.

9. A method of indicating at the earth surface when a drilling assembly that is connected to a drill string and includes a down hole motor having a stator and a rotor is in a preselected limit of deviation from earth vertical, said method comprising the steps of pumping drilling fluid down the drill string, actuating the down hole motor to rotate the rotor relative to the stator and temporarily changing the resistance to the flow of drilling fluid in the drill string at time intervals related to the rotation rate of the rotor to create pressure pulses in the drilling fluid that can be detected at the earth surface to indicate by their presence alone that the assembly is in said preselected limit of deviation from earth vertical.

10. Apparatus for indicating at the earth surface when a drill string supported down hole drilling assembly is in a given orientation relative to the earth, comprising means for creating a temporary change in the resistance to the flow of drilling fluid in the drill string to create a pressure pulse in the drilling fluid that is detectable at the earth surface, means for actuating said pressure pulse creating means periodically during uninterrupted drilling fluid flow, and means for preventing the creating of said pressure pulses when the drilling assembly is in a given orientation relative to said preselected orientation with respect to the earth.

11. The apparatus of claim 10 having means responsive to the drill string rotation rate to deactivate the means to prevent the creation of a drilling fluid pressure pulse when the drill string is rotating above a preselected rate.

12. The apparatus of claim 10 being further provided with means responsive to the rate of flow of drilling fluid through the drill string to adjust said preselected orientation so that said pressure pulses in the drilling fluid stream will be created as a response to a preselected orientation of the down hole drilling assembly, the preselected orientation being responsive to drilling fluid flow rate.

13. Apparatus for indicating at the earth surface when a drill string supported down hole drilling assembly is in a given orientation relative to the low side of a non-vertical well bore, comprising means for creating a temporary change in the resistance to the continuous flow of drilling fluid in the drill string to create a pressure pulse in the drilling fluid that is detectable at the earth surface, means for actuating said pressure pulse creating means periodically when the drilling fluid is flowing, and means for preventing the creating of said pressure pulses when the drilling assembly is in a given orientation relative to said preselected orientation with respect to the low side of the well bore.

14. The apparatus of claim 13 in which said means for creating a temporary change in the resistance to the flow of drilling fluid includes a valve in the drill string and means for periodically actuating a valve to restrict said flow and in which said pulse preventing means includes a pendulum and means responsive to the position of the pendulum to prevent the actuation of said valve when the pendulum is in a preselected position relative to the drilling assembly.

15. The apparatus of claim 13 in which said means for creating a temporary change in the resistance to the flow of drilling fluid includes a valve seat through which drilling fluid flows and a valve element, a rod for moving the valve element toward and away from the valve seat in the drilling fluid stream to periodically restrict the flow of drilling fluid through the seat and create a pressure pulse that can be detected at the surface, and in which the signal preventing means includes a stop member mounted on the rod and rotatable relative thereto with its center of gravity spaced from its axis of rotation so that the member will position itself with its center of gravity on the low side of the well bore, and a stop lug attached to the drill string for engaging the member and preventing the movement of the valve toward the seat to restrict the flow of drilling fluid when the drilling assembly is in a given orientation relative to the low side of the well bore.

16. Apparatus for indicating at the earth surface when a drill string supported down hole drilling assembly is in a given orientation relative to a magnetic field, comprising means for creating a temporary change in resistance to the flow of drilling fluid in the drill string to create an occasional pressure pulse during continuous drilling fluid flow that is detectable at the surface, means for actuating said means for creating a temporary change in the resistance to the flow of drilling fluid periodically when the drilling fluid is flowing, and means for preventing the creation of said pressure pulse when the drilling assembly is not in a preselected orientation with respect to a magnetic field.

17. The apparatus of claim 16 in which means for preventing the creation of a pressure pulse comprises a magnetic compass free to rotate relative to the down hole drilling assembly to orient relative to a magnetic field in the earth, means to detect the position of said compass relative to the down hole drilling assembly and means to disable the means to create a pressure pulse in the drilling fluid stream in response to said compass position detector means unless said magnetic compass is in a preselected orientation relative to the down hole drilling assembly.

18. The apparatus of claim 17 in which the apparatus includes a down hole motor to provide power to the apparatus and a pump that is driven by the motor to provide fluid under pressure, means to periodically make said fluid power available to a probe valve which when actuated by said periodically available fluid pressure advances a probe toward the compass which has, for a part of the compass touchable by the probe, a surface describing a hole large enough to accept said probe, the probe being attached to a spool valve so shaped relative to the fluid channels with which it co-operates that if the probe encounters the hole the distance traveled will cause the spool valve to conduct the fluid under pressure on to said means to actuate said means for creating a temporary change in resistance to the flow of drilling fluid to create a pressure pulse in the drilling fluid stream detectable at the earth surface, said probe so related to the spool valve that if the advancing probe misses the hole in said compass the probe will cause said valve to cause fluid under pressure to be channeled such that it will not influence said means to actuate said means for creating a temporary change in resistance to the flow of drilling fluid.

19. Apparatus for indicating at the earth surface when a drill string supported down hole drilling assembly is within a particular error limit of a preselected orientation relative to the earth, comprising means for creating a temporary change in resistance to the flow of drilling fluid through the drill string to create a pressure pulse that is detectable at the earth surface, means for actuating said pressure pulse creating means periodically when the drilling fluid is flowing, and means for preventing the creation of said pressure pulse when the drilling assembly is not within a particular error limit of the preselected orientation relative to earth, with means responsive to a first preselected rate of flow of drilling fluid to activate a first sensor to sense the deviation from earth vertical of the down hole drilling assembly as an orientation limit so that deviation from earth vertical within a preselected limit results in a pressure pulse being created, said means responding to a second preselected drilling fluid flow rate to activate a second sensor to detect as an orientation limit the azimuthal orientation of the down hole drilling assembly with respect to the low side of a non-vertical well bore to cause the creation of a pressure pulse in the drilling fluid stream if the azimuthal orientation is within preselected limits.

20. The apparatus of claim 19 having means responsive to the drill string rotation rate to disable the means to prevent the creation of a drilling fluid pressure pulse when the drill string is rotating above a preselected rate so that when the drill string is rotating above said rate a drilling fluid pressure pulse will be created at preselected intervals of down hole motor rotation, said intervals serving as an indication of down hole motor rotational speed.

21. Appratus for indicating at the earth surface when a drill string supported down hole drilling assembly is within a particular error limit of a preselected orientation relative to the arth, comprising means for creating a temporary change in resistance to the flow of drilling fluid through the string to create a pressure pulse that is detectable at the earth surface, means for actuating pressure pulse creating means periodically when the drilling fluid is flowing, and means for preventing the creation of said pressure pulse when the drilling assembly is not within a particular error limit of the preselected orientation relative to earth with means responsive to a first preselected rate of flow of drilling fluid to activate a first sensor to sense the orientation of the down hole drilling assembly relative to a magnetic field as an orientation limit with said means to respond to a second preselected drilling fluid flow rate to activate a second sensor to detect as an orientation limit the azimuthal orientation of the down hole drilling assembly with respect to the low side of a non-vertical well bore.

* * * * *